(12) United States Patent
Sobel et al.

(10) Patent No.: US 8,910,155 B1
(45) Date of Patent: Dec. 9, 2014

(54) METHODS AND SYSTEMS FOR INJECTING ENDPOINT MANAGEMENT AGENTS INTO VIRTUAL MACHINES

(75) Inventors: William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 359 days.

(21) Appl. No.: 12/938,039

(22) Filed: Nov. 2, 2010

(51) Int. Cl.
| | | |
|---|---|---|
| G06F 9/455 | (2006.01) | |
| H04L 29/06 | (2006.01) | |
| G06F 17/30 | (2006.01) | |
| G06F 9/445 | (2006.01) | |

(52) U.S. Cl.
USPC .................. 718/1; 713/164; 726/2; 717/174

(58) Field of Classification Search
None
See application file for complete search history.

(56) References Cited

U.S. PATENT DOCUMENTS

| | | | |
|---|---|---|---|
| 7,191,441 B2 | 3/2007 | Abbott et al. | |
| 7,647,589 B1 | 1/2010 | Dobrovolskiy et al. | |
| 8,151,264 B2* | 4/2012 | Bennett et al. | 718/1 |
| 8,225,317 B1 | 7/2012 | Chiueh et al. | |
| 2004/0103310 A1 | 5/2004 | Sobel et al. | |
| 2006/0130060 A1* | 6/2006 | Anderson et al. | 718/1 |
| 2006/0136720 A1 | 6/2006 | Armstrong et al. | |
| 2006/0248581 A1 | 11/2006 | Sundarrajan et al. | |
| 2006/0271395 A1* | 11/2006 | Harris et al. | 705/1 |
| 2007/0006227 A1* | 1/2007 | Kinney et al. | 718/1 |
| 2007/0157197 A1* | 7/2007 | Neiger et al. | 718/1 |
| 2007/0230504 A1 | 10/2007 | Smith et al. | |
| 2008/0134175 A1 | 6/2008 | Fitzgerald et al. | |
| 2008/0282241 A1 | 11/2008 | Dong | |
| 2009/0007100 A1 | 1/2009 | Field et al. | |
| 2009/0007218 A1 | 1/2009 | Hubbard | |
| 2009/0241109 A1* | 9/2009 | Vandegrift et al. | 718/1 |
| 2009/0293056 A1* | 11/2009 | Ferris | 718/1 |
| 2009/0328030 A1* | 12/2009 | Fries | 717/174 |
| 2010/0138815 A1* | 6/2010 | Schneider | 717/141 |
| 2011/0107331 A1* | 5/2011 | Evans et al. | 718/1 |
| 2011/0126207 A1* | 5/2011 | Wipfel et al. | 718/104 |

(Continued)

FOREIGN PATENT DOCUMENTS

JP 2008077558 4/2008

OTHER PUBLICATIONS

Ashlesha Joshi, et al.; Detecting Past and Present Intrusions through Vulnerability-Specific Predicates; SOSP'05; Oct. 23-26, 2005; ACM; Brighton, United Kingdom.

(Continued)

*Primary Examiner* — Meng An
*Assistant Examiner* — Tammy Lee
(74) *Attorney, Agent, or Firm* — ALG Intellectual Property, LLC

(57) ABSTRACT

A method for inserting endpoint management agents into virtual machines. The method may include 1) identifying a process space of a virtual machine, the process space comprising at least one process of the virtual machine, 2) interrupting the process of the virtual machine by causing execution to transfer from the process of the virtual machine to an agent-insertion module that executes outside the process space of the virtual machine, 3) injecting, via the agent-insertion module, an endpoint management agent into the virtual machine, and 4) performing one or more endpoint management tasks on the virtual machine by causing the endpoint management agent to execute within the process space of the virtual machine. Various other methods, systems, and computer-readable media are also disclosed.

20 Claims, 11 Drawing Sheets

(56) References Cited

U.S. PATENT DOCUMENTS

| | | | |
|---|---|---|---|
| 2011/0154325 A1 | 6/2011 | Terasaki | |
| 2011/0246986 A1* | 10/2011 | Nicholas et al. | 718/1 |
| 2012/0066681 A1* | 3/2012 | Levy et al. | 718/1 |
| 2012/0084517 A1* | 4/2012 | Post et al. | 711/153 |

OTHER PUBLICATIONS

Tal Garfinkel, et al.; Terra: A Virtual Machine-Based Platform for Trusted Computing; SOSP'03: Proceedings of the Nineteenth ACM Symposium on Operating Systems Principles; Oct. 19-22, 2003; ACM; Bolton Landing, New York, USA.

Bryan D. Payne, et al.; Lares: An Architecture for Secure Active Monitoring Using Virtualization; Proceedings of the 2008 IEEE Symposium on Security and Privacy; 2008.

Peter Ferrie, et al.; Virus Analysis 1—Worm Wars; Virus Bulletin; Oct. 2003; pp. 5-8; virusbtn.com.

Vitaly Shmatikov; Malware: Worms and Botnets; 2011; cs.utexas.edu/~shmat/courses/cs378_spring11/botnets.pdf.

Rachit Mathur, et al.; Analysing the Packer Layers of Rogue Anti-Virus Programs; Virus Bulletin Conference Oct. 2011; pp. 155-160.

Tim Greene; NAC has a virtual problem—Virtual networks pose problems for NAC; Security: Network Access Control Alert; Mar. 18, 2008; Network World; networkworld.com/newsletters/vpn/2008/0317nac.1.html, as accessed Jan. 20, 2010.

PR Newswire Association LLC; IBM Acts to Enhance Security of Virtual Environments; Nov. 13, 2009; prnewswire.com/news-release/ibm-acts-to-enhance-security-of-virtual-environments, as accessed Jan. 20, 2010; Armonk, New York.

Tzi-Cker Chiueh, et al.; Stealthy Deployment and Execution of In-Guest Kernel Agents; Aug. 1, 2009; pp. 1-12; blackhat.com/presentations/bh-usa-09/CONOVER/BHUSA09-Conover-SADEintoVM-PAPER.pdf.

Matt Conover, et al.; Code Injection From the Hypervisor; Removing the need for in-guest agents; 2009; pp. 1-36; blackhat.com/presentations/bh-usa-09/CONOVER/BHUSA09-Conover-SADEintoVM-SLIDES.pdf.

Nguyen Anh Quynh, et al; Xenprobes, A Lightweight User-space Probing Framework for Xen Virtual Machine; 2007 USENIX Annual Technical Conference; 2007; pp. 15-28; USENIX Association.

Paul Pazandak, et al.; ProbeMeister—Distributed Runtime Software Instrumentation; ECOOP 2002, Workshop on Unanticipated Software Evolution; 2002.

Reiner Sailer, et al.; Building a MAC-Based Security Architecture for the Xen Open-Source Hypervisor; 21st Annual Computer Security Applications Conference; Dec. 5-9, 2005.

Sanjay Sawhney, et al.; Systems and Methods for Providing Network Access Control in Virtual Environments; U.S. Appl. No. 12/724,414, filed Mar. 15, 2010.

\* cited by examiner

METHODS AND SYSTEMS FOR INJECTING ENDPOINT MANAGEMENT AGENTS INTO VIRTUAL MACHINES

BACKGROUND

In recent years virtualization has become a key strategy for datacenter administrators. Virtualization delivers many benefits that make it an obvious choice. For instance, Information Technology ("IT") managers may use virtualized computers to generate greater efficiencies for existing hardware investments while simultaneously reducing cooling and power costs. As with other types of system environments, virtualized environments may involve various levels of system management. System management tools may significantly aid in the implementation and ongoing maintenance of the systems and infrastructures that make up the key components of companies' virtualization strategies.

Traditional virtual machine management solutions may implement system management tools by installing in-guest management modules on each managed virtual machine. Unfortunately, such an installation process may require an IT manager to have the appropriate access credentials for each managed virtual machine. Furthermore, the traditional process of installing in-guest management modules on each managed virtual machine may be inefficient. What is needed, therefore, is a more efficient and effective way to perform virtual machine management.

SUMMARY

The instant disclosure presents various methods and systems for injecting endpoint management agents into virtual machines. For example, a method may include identifying a process space of a virtual machine. The process space may include at least one process of the virtual machine. The method may also include interrupting the process of the virtual machine by causing execution to transfer from the process of the virtual machine to an agent-insertion module that executes outside the process space of the virtual machine. The method may further include inserting, via the agent-insertion module, an endpoint management agent into the virtual machine and performing one or more endpoint management tasks on the virtual machine by causing the endpoint management agent to execute within the process space of the virtual machine.

According to various embodiments, identifying the process space of the virtual machine may include identifying the process of the virtual machine and determining that the process of the virtual machine has sufficient rights to perform the endpoint management task. In some embodiments, the endpoint management task may include determining that the virtual machine does not comply with an endpoint management policy and remediating the virtual machine to bring the virtual machine into compliance with the endpoint management policy. Additionally or alternatively, the endpoint management task may include at least one of: 1) determining the state of a registry entry of the virtual machine, 2) deleting a registry entry in the virtual machine, 3) determining whether a file or directory is present on the virtual machine, 4) deleting a file or directory from the virtual machine, 5) mounting a network drive in the virtual machine, 6) transferring a file to the virtual machine, 7) transferring a file from the virtual machine, 8) executing a program on the virtual machine, and/or 9) logging the virtual machine onto a central repository. The endpoint management task may also involve any other suitable task for managing an endpoint.

According to various embodiments, interrupting the process of the virtual machine may include: 1) inserting, into an exception handler memory location of the virtual machine, one or more computer-executable instructions configured to facilitate transfer of control from the virtual machine to the agent-insertion module, 2) triggering an exception during execution of the virtual machine to cause the one or more computer-executable instructions in the exception handler memory location to be executed, and 3) obtaining control from the virtual machine after the at least one computer-executable instruction executes.

Interrupting the process of the virtual machine may also include 1) inserting, into a first memory location of the virtual machine, one or more computer-executable instructions configured to allocate a region of memory for the endpoint management agent, where inserting the one or more computer-executable instructions into the exception handler memory location of the virtual machine includes inserting, into the exception handler memory location of the virtual machine, one or more computer-executable instructions configured to transfer execution to the first memory location of the virtual machine, 2) locating a return point of a memory allocation function of the virtual machine, and 3) setting an execution trigger associated with the memory allocation function at a point before the return point, the execution trigger being configured to transfer control to the agent-insertion module to allow the agent-insertion module to insert, into memory allocated by the memory allocation function, the one or more computer executable instructions configured to allocate a region of memory for the endpoint management agent, 4) saving a copy of data in the first location of the virtual machine before inserting the one or more computer-executable instructions configured to allocate the region of memory for the agent; 5) after the region of memory for the agent is allocated, restoring, to the first location of the virtual machine, the copy of data from the first location of the virtual machine.

In at least one embodiment, the one or more computer-executable instructions configured to allocate a region of memory for the agent of the endpoint management system may be configured to 1) call a memory allocation function of the virtual machine and 2) return an address of a memory region allocated by the memory allocation function to the agent-insertion module, where the agent-insertion module inserts the agent into the virtual machine at the memory region allocated by the memory allocation function.

According to certain embodiments, a system for inserting endpoint management agents into virtual machines may include 1) an identification module programmed to identify a process space of a virtual machine, the process space comprising at least one process of the virtual machine, 2) an endpoint management agent programmed to execute within the process space of the virtual machine and perform one or more endpoint management tasks on the virtual machine, 3) an agent-insertion module programmed to execute outside the process space of the virtual machine and insert the endpoint management agent into the virtual machine, and 4) a control-transfer module programmed to interrupt the process of the virtual machine by causing execution to transfer from the process of the virtual machine to the agent-insertion module.

Features from any of the above-mentioned embodiments may be used in combination with one another in accordance with the general principles described herein. These and other embodiments, features, and advantages will be more fully understood upon reading the following detailed description.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
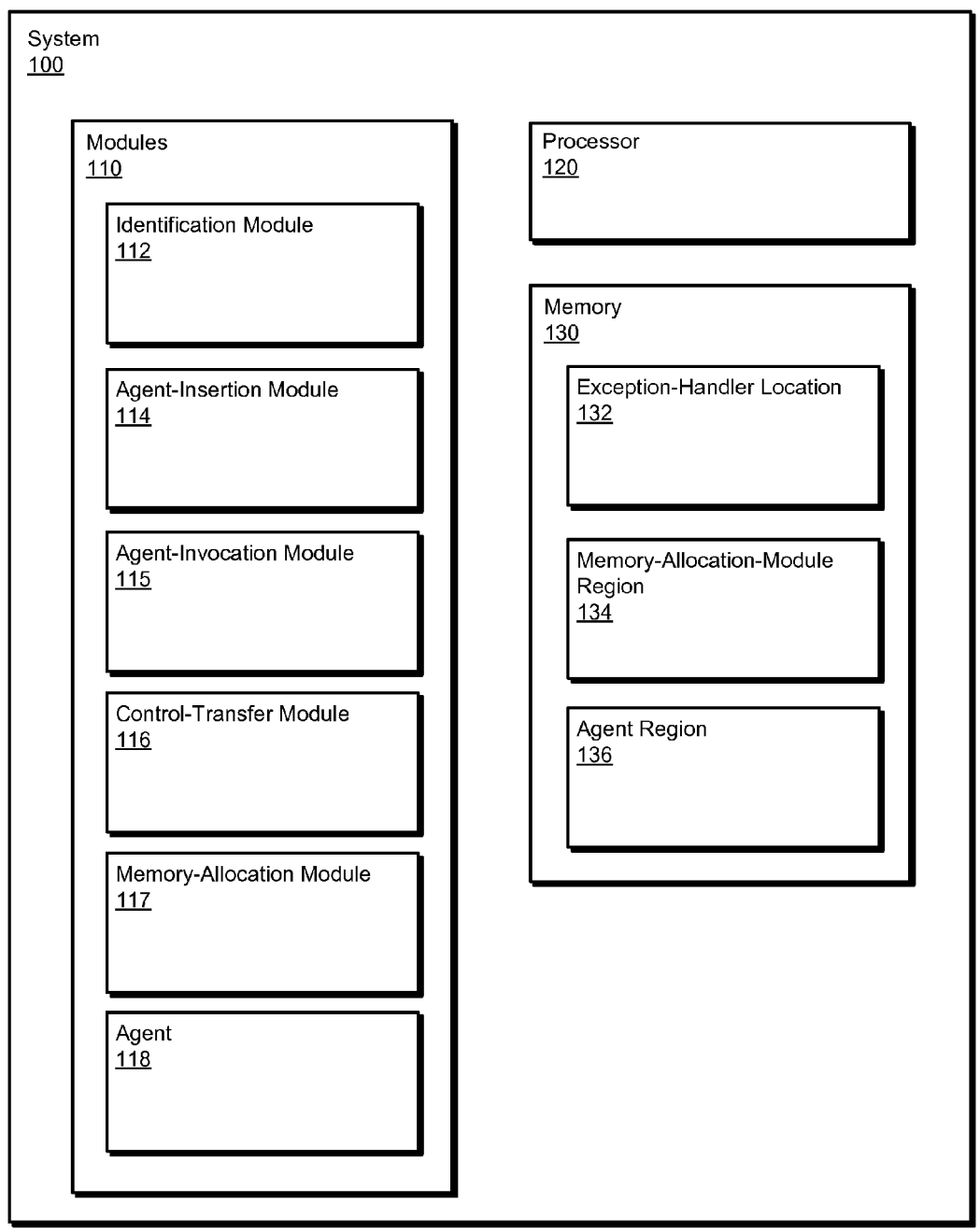
FIG. 1 is a block diagram of an exemplary system for inserting and invoking an agent of an endpoint management system according to certain embodiments.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the instant disclosure.

DETAILED DESCRIPTION

The instant disclosure presents various methods and systems for injecting endpoint management agents into virtual machines. By injecting endpoint management agents into virtual machines, embodiments of the instant disclosure may enable centralized management of applications running on different virtual machines without requiring pre-installed agents and/or specific credentials for the virtual machines.

Conceptually, embodiments of the instant disclosure may be designed to inject a piece of arbitrary binary code into a virtual machine's kernel and then execute the code within the virtual machine's kernel address space in a way that does not require installing any new code in that virtual machine and/or does not require credentials for accessing the virtual machine. Moreover, other than calling kernel service functions, the execution of the injected code may be invisible to the virtual machine into which it is injected. Embodiments of the instant disclosure provide an out-of-virtual-machine kernel code injection mechanism that may replicate the main functionality of a kernel loader outside the virtual machine whose kernel is the target of code injection, and therefore may not need to involve the virtual machine (or its kernel loader) at all.

Figure 2:
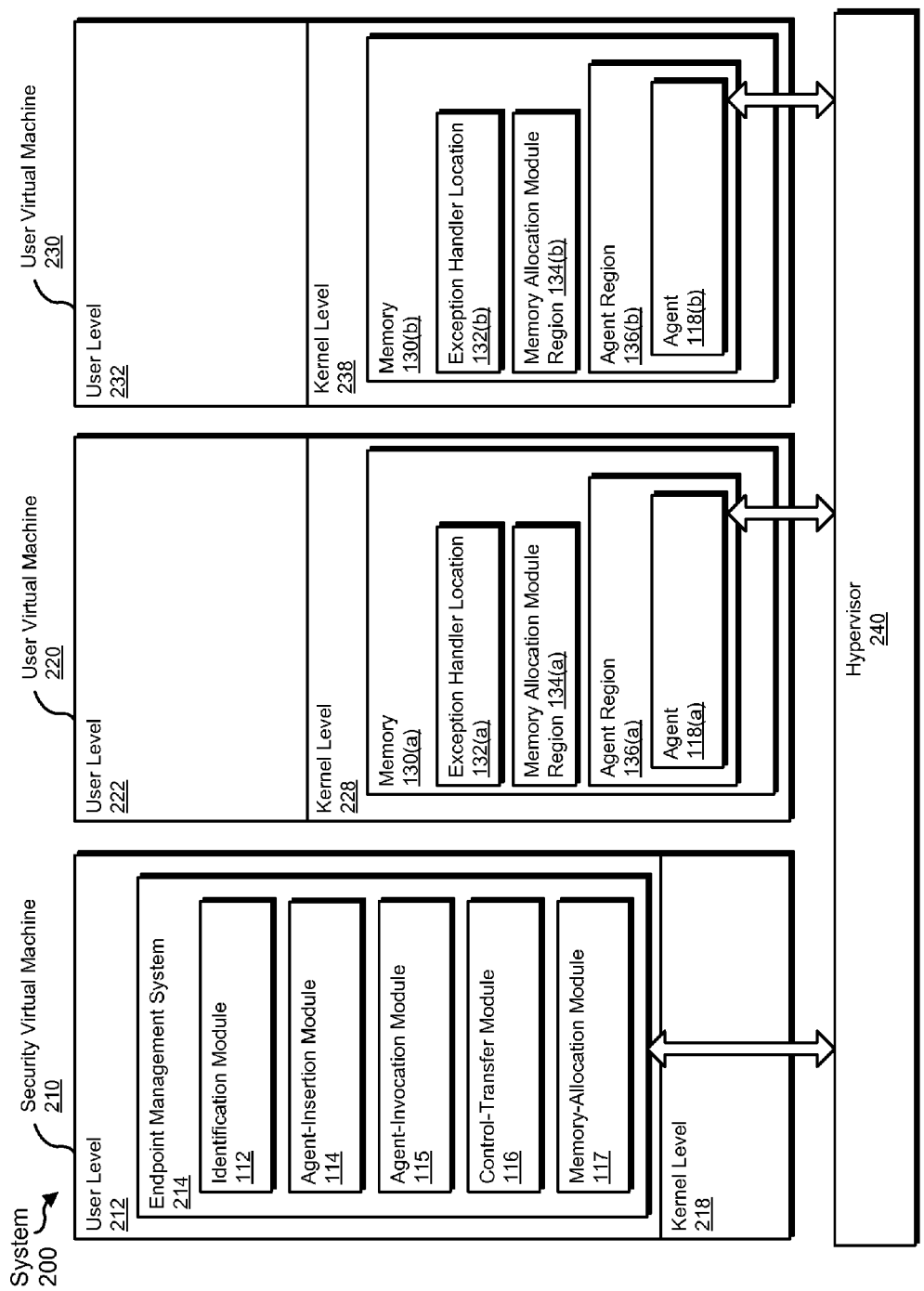
FIG. 2 is a block diagram of another exemplary system for inserting and invoking an agent of an endpoint management system according to certain embodiments.
Figure 3:
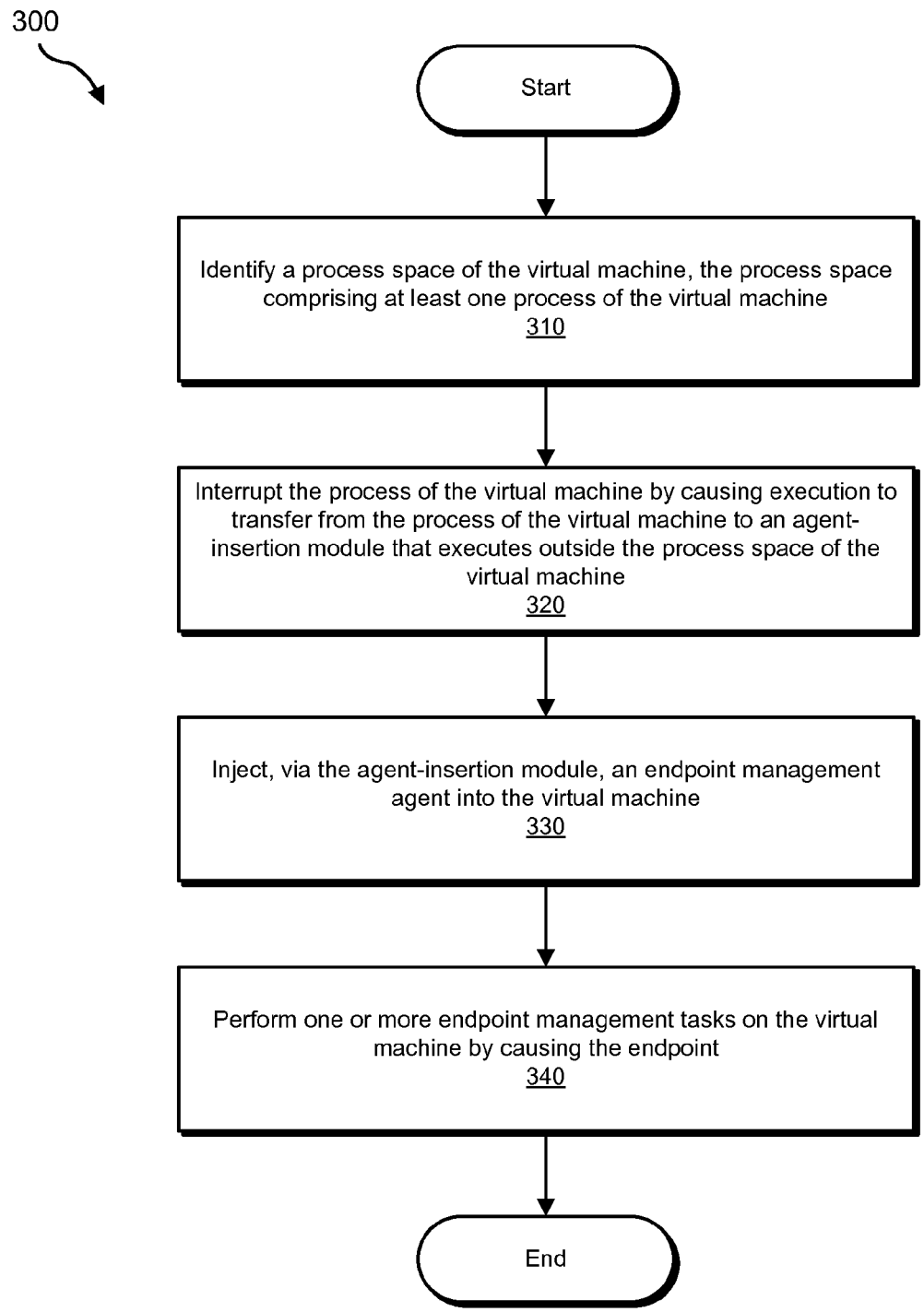
FIG. 3 is a flow diagram of an exemplary method for inserting an agent of an endpoint management system according to certain embodiments.
Figure 5:
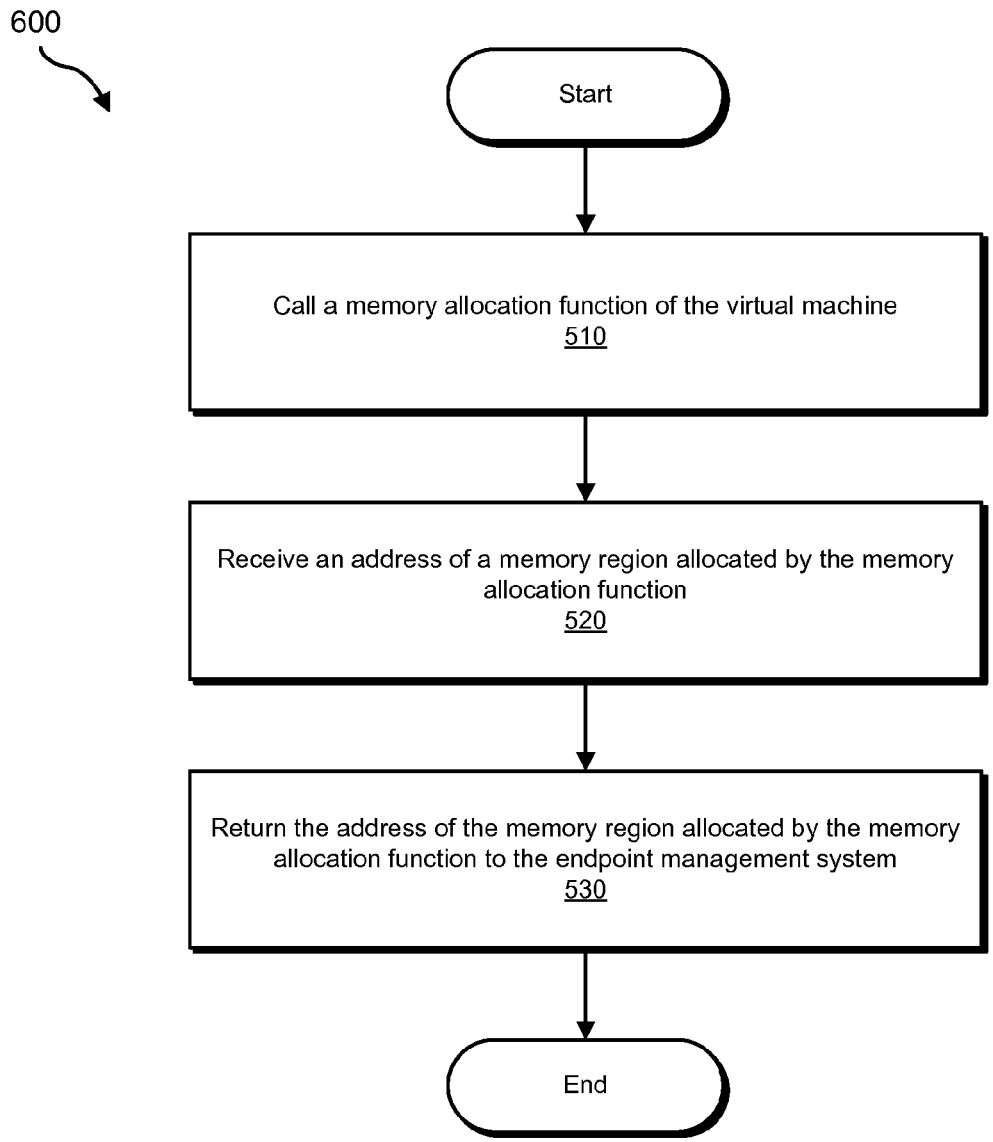
FIG. 5 is a flow diagram of an exemplary method performed by code configured to allocate a region of memory for an agent of an endpoint management system according to certain embodiments.
Figure 6:
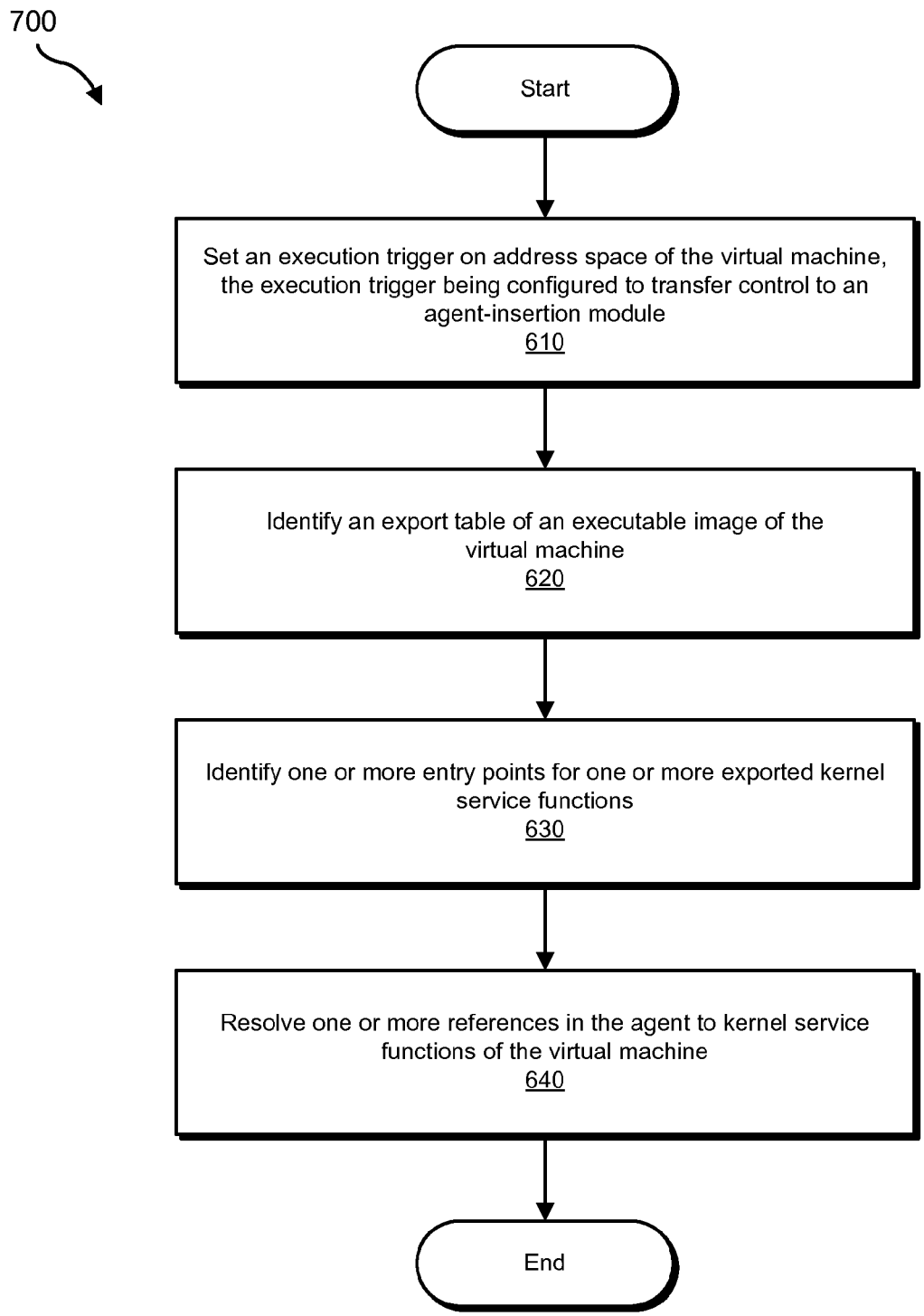
FIG. 6 is a flow diagram of an exemplary method for resolving one or more references in an agent to kernel service functions of a virtual machine according to certain embodiments.
Figure 7:
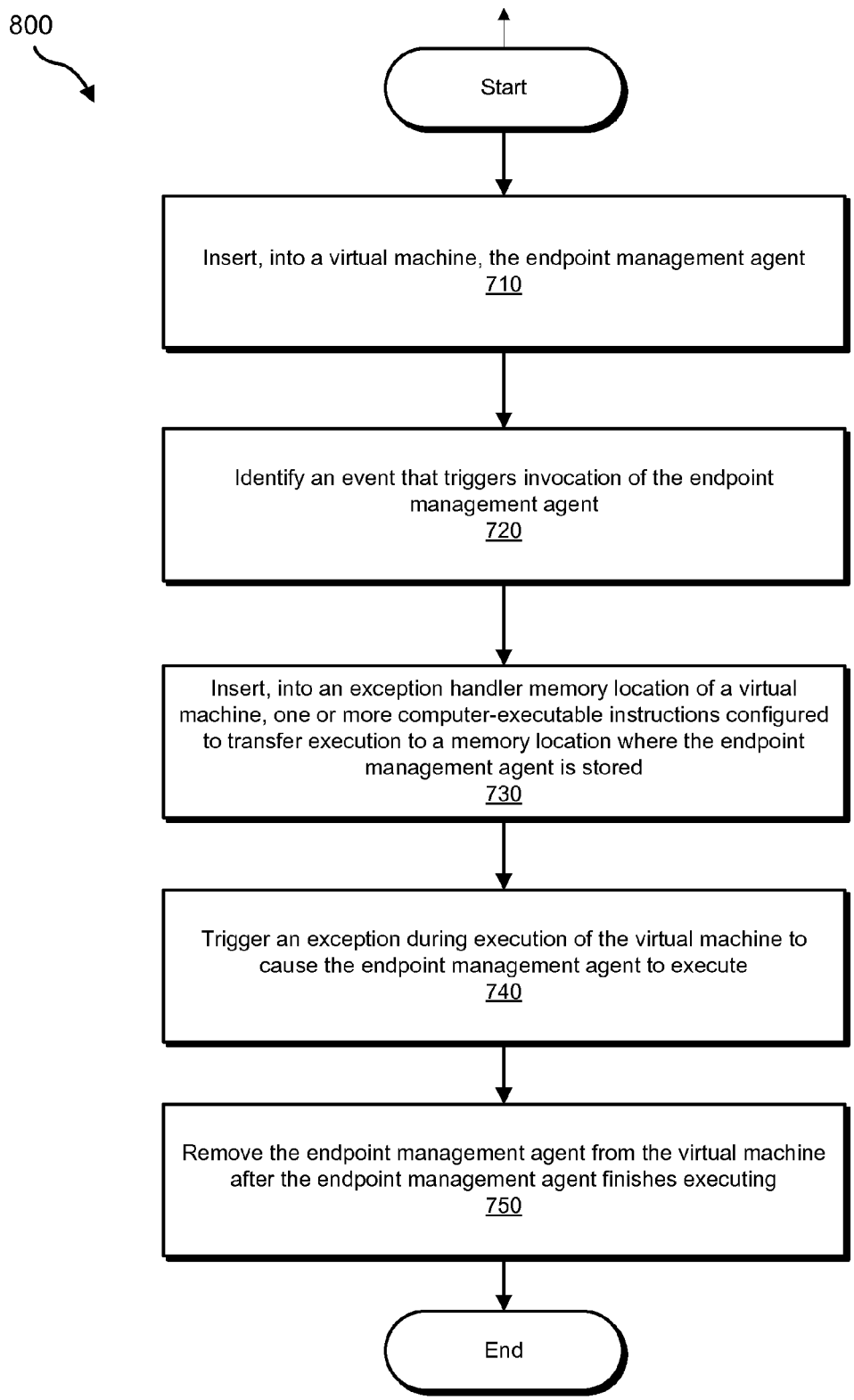
FIG. 7 is a flow diagram of an exemplary method for invoking an agent of an endpoint management system according to certain embodiments.
Figure 8:
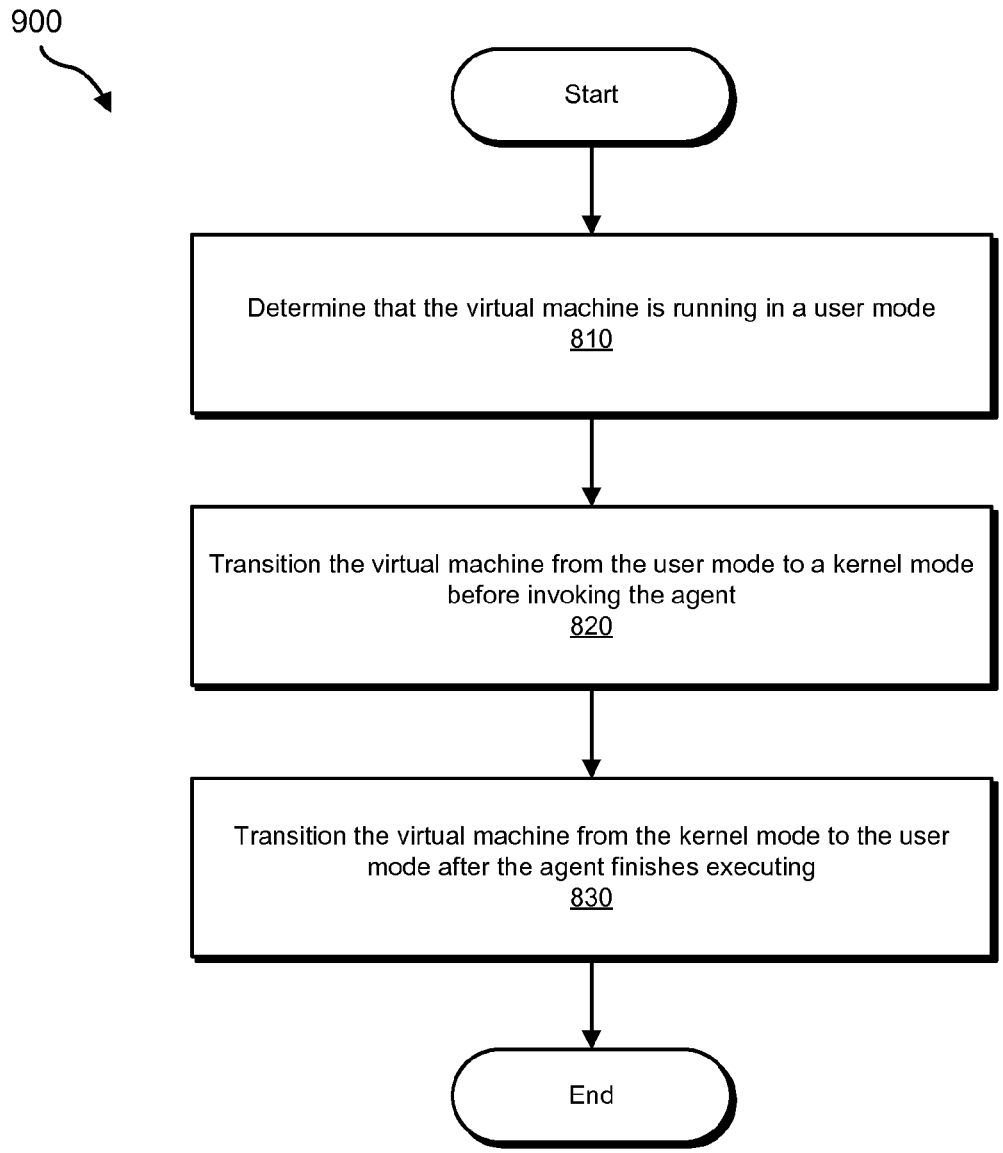
FIG. 8 is a flow diagram of an exemplary method for transitioning a virtual machine from a user mode to a kernel mode to allow an agent to execute on the virtual machine according to certain embodiments.
Figure 9:
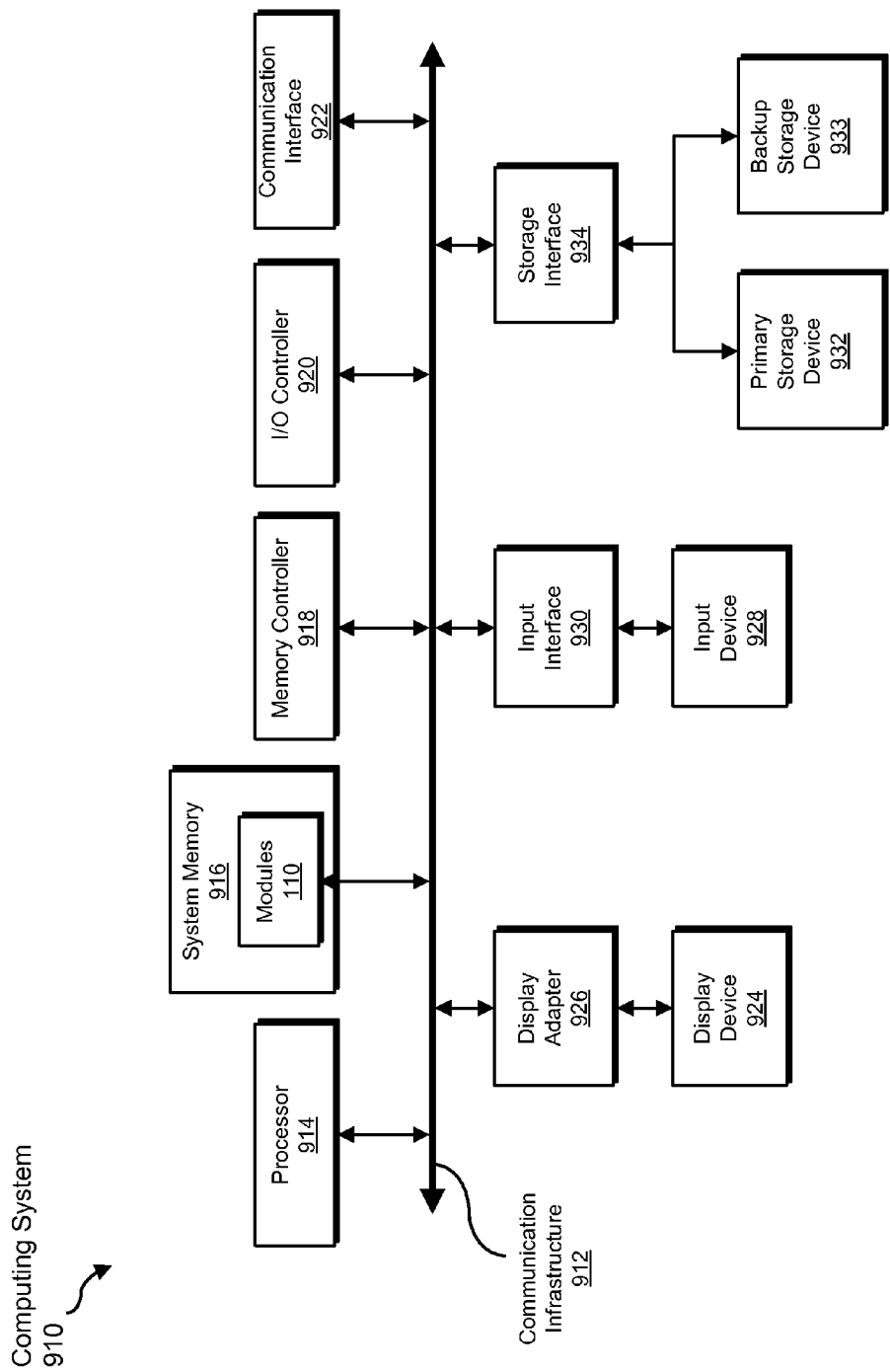
FIG. 9 is a block diagram of an exemplary computing system capable of implementing one or more of the embodiments described and/or illustrated herein.
Figure 10:
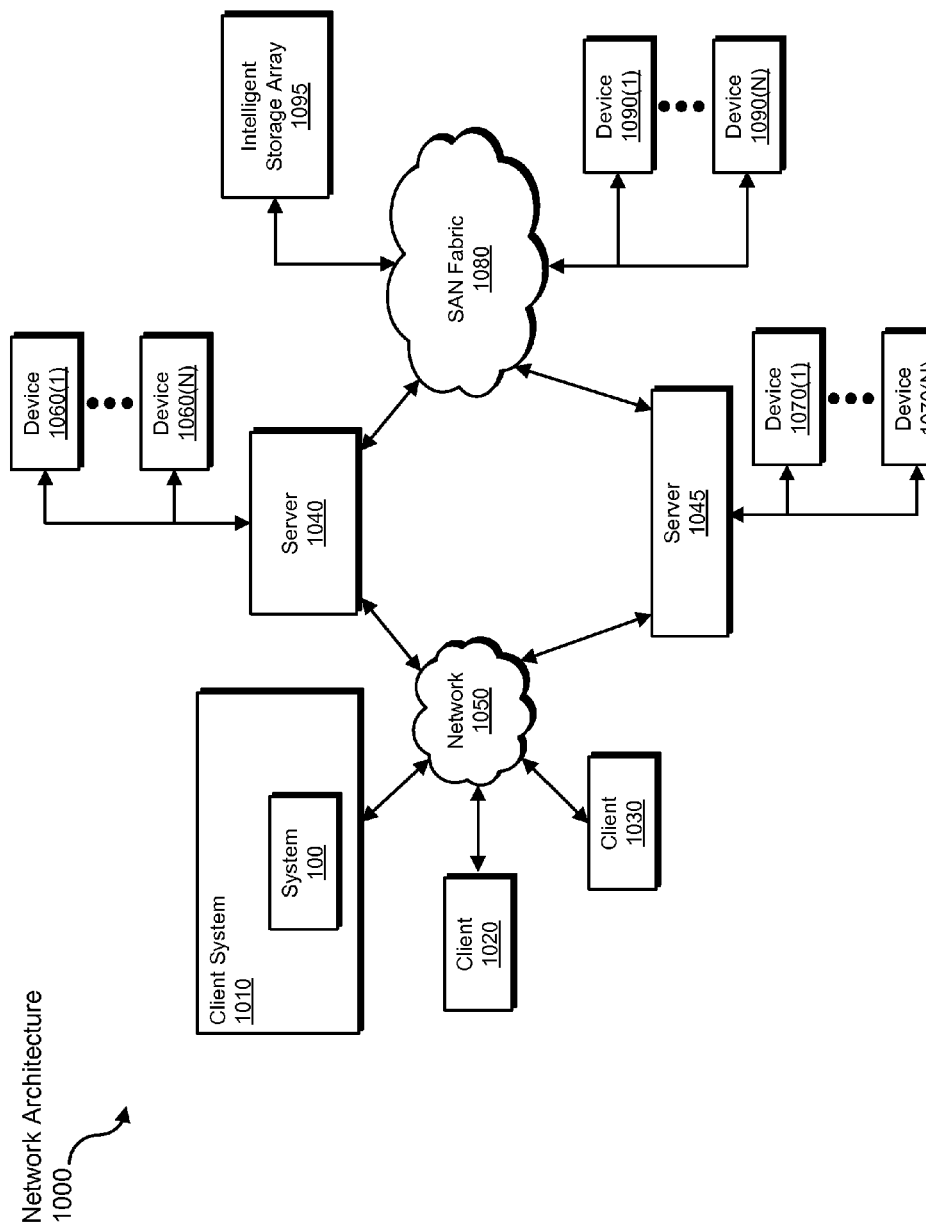
FIG. 10 is a block diagram of an exemplary computing network capable of implementing one or more of the embodiments described and/or illustrated herein.

In the following disclosure, FIGS. 1 and 2 present exemplary systems for injecting and invoking endpoint management. FIG. 3 presents an exemplary method for injecting an agent into a virtual machine, FIG. 4 presents a more detailed example of injecting an agent into a virtual machine, and FIG. 5 presents steps performed by a memory allocation module. FIG. 6 illustrates an exemplary method for preparing an agent for insertion by resolving one or more references in the agent to kernel service functions of a virtual machine. FIG. 7 shows an exemplary method for invoking an agent, and FIG. 8 shows an exemplary method for transitioning a virtual machine to a kernel mode to allow the agent to be invoked. FIGS. 9 and 10 illustrate an exemplary computing system and network architecture for implementing embodiments of the instant disclosure.

FIG. 1 illustrates a system 100 capable of inserting and/or invoking an endpoint management agent. As shown, system 100 includes modules 110, a processor 120, and memory 130. Modules 110 may include an identification module 112, an agent-insertion module 114, an agent-invocation module 115, a control transfer module 116, a memory-allocation module 117, and an agent 118. Identification module 112 may be programmed to identify a process space of a virtual machine, where the process space includes at least one process of the virtual machine. Agent-insertion module 114 may be programmed to execute outside the process space of the virtual machine and insert the endpoint management agent into the virtual machine, and agent-invocation module 115 may be programmed to perform one or more of the steps involved in invoking an agent in a virtual machine.

Control-transfer module 116 may be programmed to interrupt the process of the virtual machine by causing execution to transfer from the process of the virtual machine to the agent-insertion module. Memory-allocation module 117 may include code programmed to be inserted into the virtual agent and to allocate memory in the virtual machine (e.g., memory-allocation module 117 may be a bootstrap mechanism for invoking a memory allocation function of a virtual machine). Agent 118 may be programmed to execute within the process space of the virtual machine and perform one or more endpoint management tasks on the virtual machine.

Agent 118 may include any code programmed to run in a virtual machine and communicate with an endpoint management system external to the virtual machine. Agent 118, which may also be referred to as an in-guest agent, may perform various functions on behalf of an endpoint management system. For example, an in-guest agent, such as agent 118, may determine the state of a registry entry of the virtual machine, deleting a registry entry in the virtual machine, determine whether a file or directory is present on the virtual machine, delete a file or directory from the virtual machine, mount a network drive in the virtual machine, cause a file to be transferred to the virtual machine, transfer a file from the virtual machine, execute a program on the virtual machine, log the virtual machine onto a central repository, and/or perform any other endpoint management task. Agent 118 may also install and/or uninstall one or more software programs on a virtual machine. For example, agent 118 may initiate an installation process or uninstall process of the virtual machine. Alternatively, agent 118 may include the code (e.g., a scripting primitive) to uninstall a software program from a virtual machine.

In certain embodiments, one or more of modules 110 in FIG. 1 may represent one or more software applications or programs that, when executed by a computing system, may cause the computing system to perform one or more steps disclosed herein. For example, as will be described in greater detail below, one or more of modules 110 may represent software modules configured to run on one or more computing devices, such as computing system 910 in FIG. 9 and/or portions of exemplary network architecture 1000 in FIG. 10. One or more of modules 110 in FIG. 1 may also represent all or portions of one or more special-purpose computers configured to perform one or more of the tasks associated with the steps disclosed herein.

In some embodiments, one or more of the modules and/or computer executable instructions discussed herein may include instructions that execute directly on a physical machine running the virtual machine. For example, the modules and computer-executable instructions discussed herein may include assembly and/or machine language instructions. The instructions may be programmed to execute on any suitable instruction set architecture. For example, the instructions may be programmed to execute on an x86 architecture, a Reduced Instruction Set Computer ("RISC") architecture, an Itanium ("IA-64") architecture, a POWER architecture, a Scalable Processor Architecture ("SPARC") architecture, and/or any other suitable architecture.

Processor 120 of system 100 may include one or more microprocessors and/or central processing units configured to execute one or more instructions of one or more modules 110. For example, processor 120 may include processor 914 in FIG. 9. Processor 120 may be communicatively coupled to memory 130, which may include an exception-handler location 132, a memory-allocation-module region 134, and an agent region 136. Exception-handler location 132 may include a virtual machine memory location that includes code associated with handling an exception of the virtual machine. Memory-allocation-module region 134 may include a region of memory of a virtual machine to which memory-allocation module 117 may be inserted. Agent region 136 may include a region of memory of a virtual machine to which agent 118 may be inserted.

FIG. 2 illustrates a system 200 that shows an exemplary configuration of components of system 100. System 200 may include a security virtual machine 210, a user virtual machine 220, and a user virtual machine 230. System 200 may also include a hypervisor 240. Security virtual machine 210 may include a user level 212 and a kernel level 218. User level 212 may include an endpoint management system 214, which may include identification module 112, agent-insertion module 114, agent-invocation module 114, control-transfer module 116, and memory-allocation module 117. As used herein, the phrase "endpoint management system" may refer to any computer-executable code configured to perform one or more management tasks on guest virtual machines. While FIG. 2 shows endpoint management system 214 in security virtual machine 210, endpoint management system 214 may also be located in hypervisor 240 and/or in any other suitable location.

Returning to FIG. 2, user virtual machine 220 may include a user level 222 and a kernel level 228. Kernel level 228 may include memory 130(a), which may include exception handler location 132(a), memory allocation module region 134(a), and agent region 136(a). As shown, agent 118(a) may be injected into memory 130(a) at agent region 136(a). Similarly, user virtual machine 230 may include a user level 232 and a kernel level 238. Kernel level 238 may include memory 130(b), which may include exception handler location 132(b), memory allocation module region 134(b), and agent region 136(b). As shown, agent 118(b) may be injected into memory 130(b) at agent region 136(b).

Hypervisor 240 may manage user virtual machines 220 and 230. Hypervisor 240 may include any suitable virtualization software, such as VMWARE, ORACLE VM, ESX SERVER, LYNXSECURE, TRANGO, IBM POWER, and/or any other suitable hypervisor.

FIG. 3 shows an exemplary method 300 for inserting an agent of an endpoint management system into a virtual machine. The steps shown in FIG. 3 may be performed by any suitable computer-executable code and/or computing system. At step 310 one or more of the systems described herein may identify a process space of a virtual machine. For example, identification module 112 may identify a process space of user virtual machine 220.

Identification module 112 may identify a process space of a virtual machine in a variety of ways. For example, identification module 112 may identify a process space of a virtual machine simply by identifying the virtual machine (e.g., by querying a hypervisor that manages the virtual machine). Alternatively, identification module 112 may identify a process space of a virtual machine by inspecting resources of a host machine, by identifying a process of the virtual machine, and/or in any other suitable manner.

As used herein, the phrase "process space" generally refers to any set of one or more related processes that are independent of, and can be controlled separately from, other processes on a system. For example, each virtual machine on a system may execute within its own process space on that system. In the example shown in FIG. 2, security virtual machine 210 may execute in a first process space, user virtual machine 220 may execute in a second process space, and user virtual machine 230 may execute in a third process space. Hypervisor 240 may also execute in a process space distinct from the process spaces of security virtual machine 210, user virtual machine 220, and user virtual machine 230.

A process space may include one or more processes, Operating System (OS) descriptors, image and memory, security attributes, processor state, and/or any other resource of a virtual machine, hypervisor, and/or host machine. Operating system descriptors may be descriptors of resources that are allocated to a process, such as file descriptors (UNIX terminology) or handles (WINDOWS), and data sources and sinks. An image portion of a process space may include an image of the executable machine code associated with an application. Memory of a process space may typically include some region of virtual memory, and may include the executable code, process-specific data (input and output), a call stack (to keep track of active subroutines and/or other events), and a heap to hold intermediate computation data generated during run time. Security attributes may include the process owner and the set of permissions (allowable operations) for the process. Processor state, or context, may include the contents of registered and physical memory addressing. The operating system may hold some, most, or all of the above information about active processes in data structures called process control blocks.

At step 320, one or more of the systems disclosed herein may interrupt the process of the virtual machine by causing execution to transfer from the process of the virtual machine to an agent-insertion module that executes outside the process space of the virtual machine. For example, control-transfer module 116, which may execute within the process space of security virtual machine 210, may interrupt a process of user virtual machine 220 by causing execution to transfer from the process of user virtual machine 220 to agent-insertion module 114.

Control-transfer module 116 may interrupt a process of a user virtual machine in a variety of ways. For example, control-transfer module 116 may insert, into exception handler location 132(a) of user virtual machine 220, one or more computer-executable instructions configured to facilitate transfer of control from user virtual machine 220 to agent-insertion module 114. For example, control-transfer module 116 may insert a jump or branch instruction into exception handler location 132(a). The jump instruction may jump to code that allocates memory for agent 118(a) (e.g., memory-allocation module 117) and transfers control to agent-insertion module 114 to allow agent-insertion module 114 to insert agent 118(a) into user virtual machine 220. The jump instruction may also jump to code that transfers control to agent-insertion module 114 in any other suitable manner. The one or more computer-executable instructions configured to facilitate transfer of control from the virtual machine to agent-insertion module 114 may also include other instructions in addition to or instead of a jump instruction.

Control-transfer module 116 may trigger an exception during execution of user virtual machine 220 to cause the one or more computer-executable instructions in exception handler location 132(a) to be executed. Control-transfer module 116 may trigger the exception in a variety of manners. For example, as will be described below, control-transfer module 116 may trigger the exception by inserting an instruction that triggers an exception into user virtual machine 220.

Embodiments of the instant disclosure may be implemented using any exception that may cause execution to be transferred to a location where memory-allocation module 117 (or any other code configured to enable insertion of an agent) has been inserted. In some embodiments, a memory allocation module may include code programmed to be inserted into the virtual machine and to allocate memory in the virtual machine (e.g., memory-allocation module 117 may be a bootstrap mechanism for invoking a memory allocation function of a virtual machine).

For example, control-transfer module 116 may insert an instruction with an invalid op code into user virtual machine 220 to cause an "invalid op code" exception. When the instruction with the invalid op code is executed, control may be transferred to the memory location where the invalid op code handler is expected to reside (i.e., the location, such as exception handler location 132(a), where control-transfer module 116 inserted the one or more computer-executable instructions configured to facilitate transfer of control from user virtual machine 220 to agent-insertion module 114).

Agent-insertion module 114 may obtain control from user virtual machine 220 after the computer-executable instruction (or instructions) in exception handler location 132(a) executes. Agent-insertion module 114 may obtain control when agent-insertion module 114, rather than user virtual machine 220, executes on an underlying physical system. In some embodiments, agent-insertion module 114 may obtain control as a direct result of execution of the computer-executable instruction in exception handler location 132(a). In other embodiments, one or more steps may be performed after the instruction in the exception handler location executes and before agent-insertion module 114 obtains control. For example, the instruction in the exception handler memory location may transfer control to memory-allocation module 117, and memory-allocation module 117 may facilitate memory allocation for a region of memory where the agent may be inserted. Then, memory-allocation module 117 may transfer control to agent-insertion module 114.

Returning to FIG. 3, at step 330 in FIG. 3, one or more of the systems described herein may inject, via the agent-insertion module, an endpoint management agent into the virtual machine. For example, after obtaining control from user virtual machine 220, agent-insertion module 114 may insert the agent of the endpoint management system into user virtual machine 220. In some embodiments, agent-insertion module 114 may insert agent 118(a) of endpoint management system 214 into user virtual machine 220 by copying agent 118(a) to agent region 136(a). Thus, agent 118(a) may be deployed in a manner that is transparent to users.

Furthermore, agent 118(a) may be injected without providing any of the credentials that may typically be required to install software on user virtual machine 220. By hijacking a process of user virtual machine 220, agent 118(a) may assume any credentials of that process and may therefore perform any actions the hijacked process would have the right to perform. Thus, in some embodiments, identification module 112 may, when identifying a process to interrupt, select a process that has the rights to perform one or more of the functions that will be performed by agent 118(a).

Steps 310-330 may be repeated to insert agent 118(b) into user virtual machine 230 and/or to insert other agents into other user virtual machines.

At step 340, one or more of the systems described herein may perform one or more endpoint management tasks on the virtual machine by causing the endpoint management agent to execute within the process space of the virtual machine. For example, agent-invocation module 115 may invoke agent 118(a) within a process space of user virtual machine 220. The description corresponding to FIG. 7 provides various examples of how an agent may be invoked.

Agent 118(a) may perform one or more of a variety of endpoint management tasks on user virtual machine 220. In some embodiments, agent 118(a) may determine that the virtual machine does not comply with an endpoint management policy defined in endpoint management system 214. Such policies may identify security settings for endpoints (e.g., firewall and/or anti-virus settings), programs that should be installed on endpoints, programs that should not be installed on endpoints, the most up-to-date version for a program, and/or a variety of other requirements for endpoints.

If agent 118(a) determines that user virtual machine 220 does not comply with an endpoint management policy, agent 118(a) may perform one or more steps to remediate user virtual machine 220. For example, if user virtual machine 220 does not have up-to-date antivirus definitions, agent 118(a) may initiate a process for updating the antivirus definitions.

As another example, agent 118(a) may determine that user virtual machine 220 is missing a firewall program and may install the firewall program to remediate user virtual machine 220. Agent 118(a) may additionally or alternatively determine that one or more registry settings or entries on user virtual machine 220 do not comply with an endpoint management policy. In such embodiments, agent 118(a) may modify, add, and/or delete one or more registry entries to bring virtual machine 220 into compliance with the endpoint management policy.

As noted, in some embodiments an endpoint management agent may remediate a virtual machine that does not comply with an endpoint management policy. In other embodiments, an endpoint management agent prompt an endpoint management system, a hypervisor, and/or any other suitable code to remediate a virtual machine that does not comply with an endpoint management policy.

As another example, endpoint management system 214 may scan the memory pages user virtual machine 220 to determine whether any of the memory pages contain a string signature suggestive of malware. If malware is detected, endpoint management system 214 may perform remediation and/or other actions in virtual machine 220. However, it may neither be desirable nor acceptable to simply convict virtual machine 220 and kill the entire virtual machine. Instead, endpoint management system 214 may insert agent 118(*a*) into user virtual machine 220 to pinpoint the culprit process owning the memory page with the malicious signature. Agent 118(*a*) may identify a process owning the memory page of interest and may terminate the process.

In some embodiments, endpoint management system 214 and agent 118(*a*) may share a private communication mechanism based on mapping capabilities of hypervisor 240. This communication mechanism may be bidirectional. Agent 118 (*a*) may use the communication mechanism to provide runtime information regarding one or more processes executing on user virtual machine 220 to endpoint management system 214. Endpoint management system 214 may use the communication mechanism to issue commands related to particular processes on the monitored virtual machine (e.g., a command to kill a process) and/or obtain additional information about a process. Agent 118(*a*) may also issue commands to invoke functionalities that are offloaded to the endpoint management system 214.

Agent 118(*a*) may also perform a variety of other management tasks on user virtual machine 220. For example, agent 118(*a*) may determine the state of a registry entry of user virtual machine 220, delete a registry entry in user virtual machine 220, add a registry entry to user virtual machine 220, modify a registry entry in user virtual machine 220, delete a file or directory from user virtual machine 220, mount a network drive in user virtual machine 220, transfer a file to user virtual machine 220, transferring a file from user virtual machine 220, delete a file on user virtual machine 220, execute a program on user virtual machine 220, and/or log user virtual machine 220 onto a central repository.

Figure 4A:
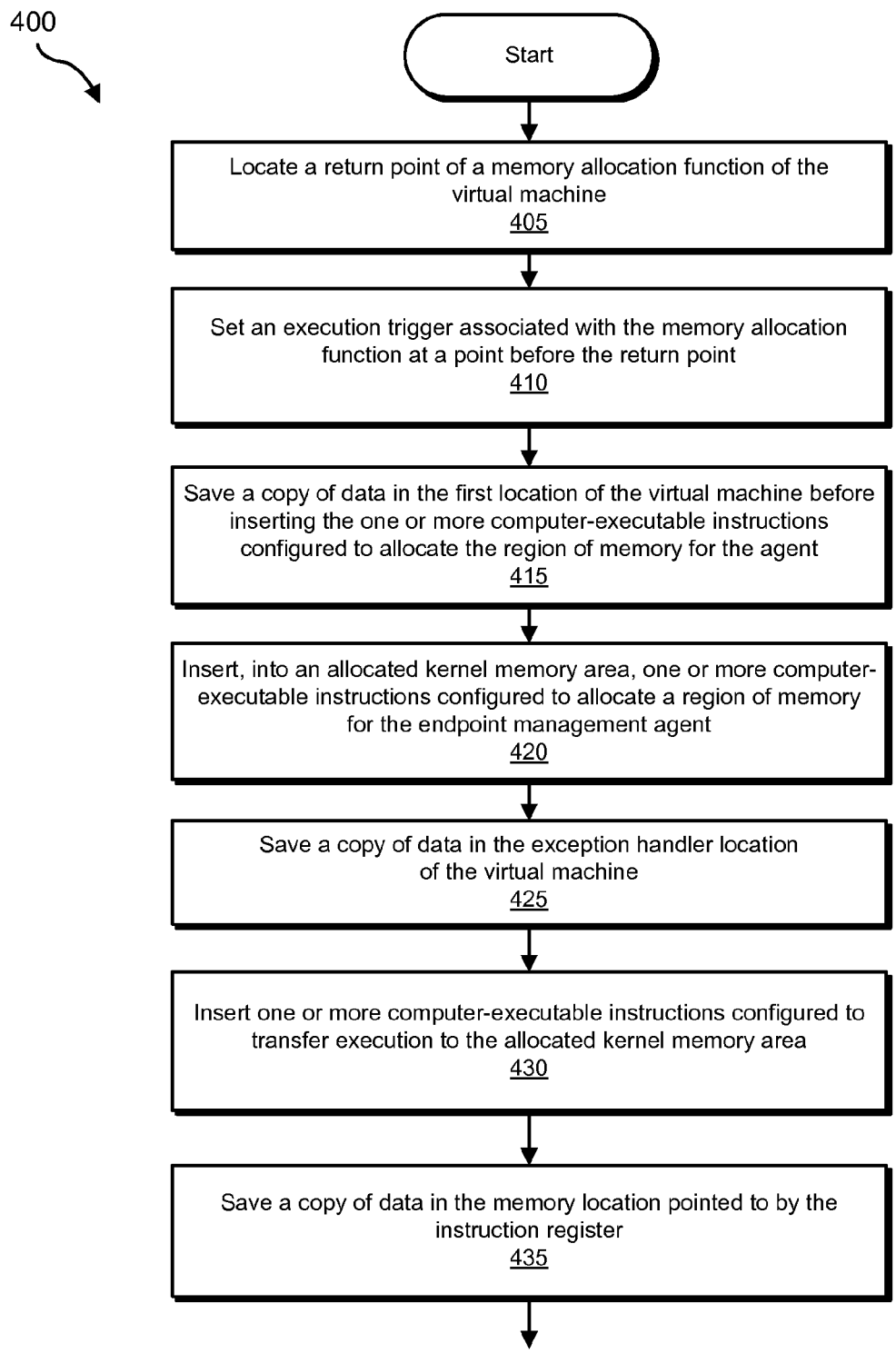
FIGS. 4A and 4B show another flow diagram of an exemplary method for inserting an agent of an endpoint management system according to certain embodiments.
Figure 4B:
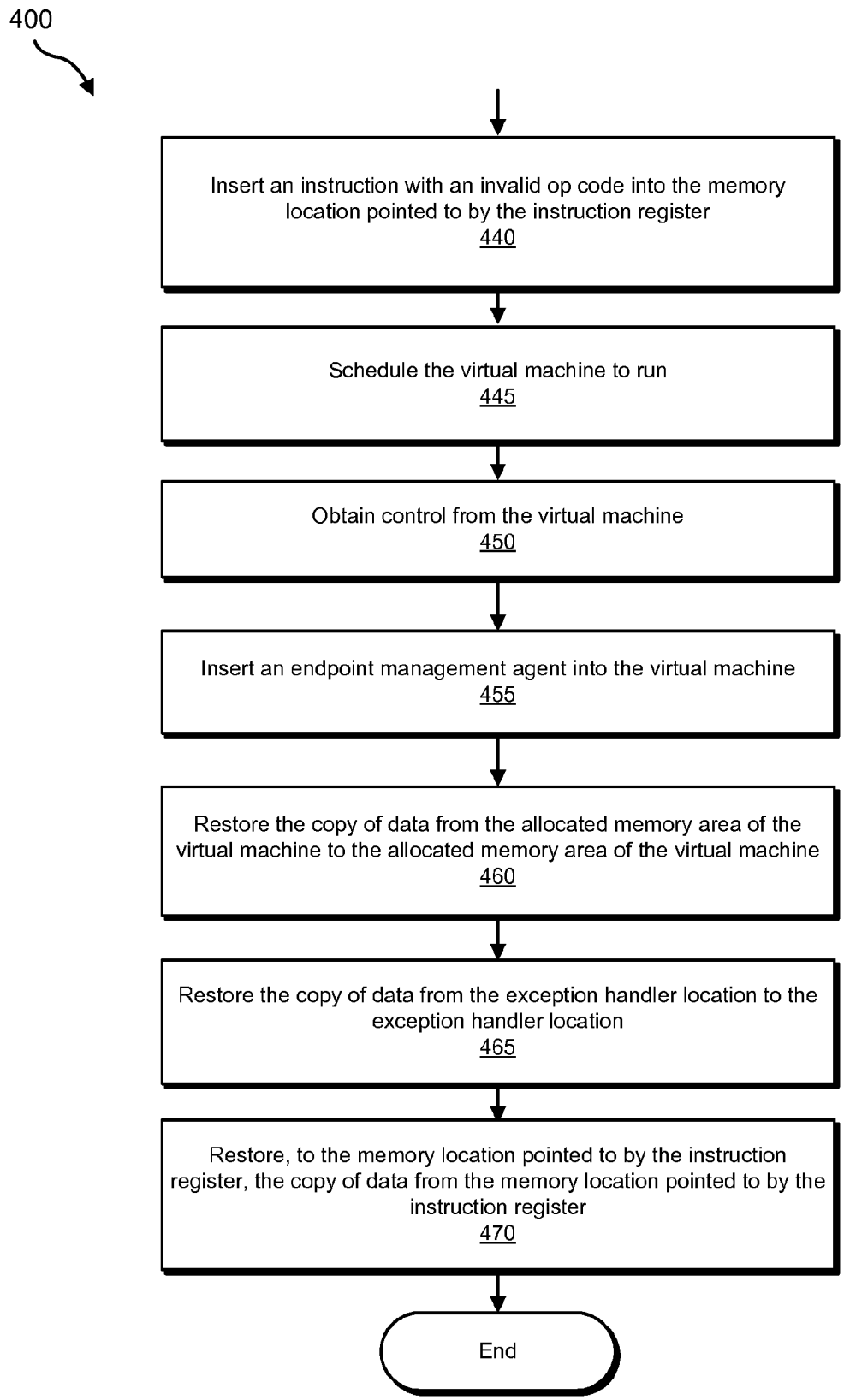

FIGS. 4A and 4B illustrate an example of how the steps shown in FIG. 3 may be implemented in an x86 environment. As with FIG. 3, the steps shown in FIGS. 4A and 4B may be performed by any suitable computer-executable code and/or computing system. In some embodiments, the steps shown in FIGS. 4A and 4B may be performed by agent-insertion module 114. At step 405, control-transfer module 116 may locate a return point of a memory allocation function of user virtual machine 220. For example, control-transfer module 116 may parse the function body of a memory allocation function (e.g., ExAllocatePool) to locate a return instruction of the memory allocation function.

At step 410, control-transfer module 116 may set an execution trigger associated with the memory allocation function at a point before the return instruction. The execution trigger may be configured to transfer control to control-transfer module 116 to allow control-transfer module 116 to insert, into memory allocated by the memory allocation function (e.g., memory allocation module region 134(*a*)), a memory allocation module. For example, control-transfer module 116 may set an execution trigger at a memory page containing the return instruction of the memory allocation function. As user virtual machine 220 boots up, the first time its kernel calls the memory allocation function and is about to return, the execution trigger may fire and control-transfer module 116 may take control. At this point, a kernel memory area, such as memory allocation module region 134(*a*), has been allocated by the memory allocation function.

At step 415, control-transfer module 116 may save a copy of data in the allocated kernel memory area (e.g., memory allocation module region 134(*a*)), and at step 420 control-transfer module 116 may insert, into the allocated kernel memory area, a memory allocation module (e.g., memory-allocation module 117), which may include one or more instructions configured to facilitate transfer of control from the virtual machine to an endpoint management system. In steps 405-420, control-transfer module 116 may hijack a kernel memory area by copying memory-allocating bootstrap code (e.g., memory-allocation module 117) to it. After execution of the bootstrap code, control may return to the original caller of the hijacked memory allocation function. This technique may be effective in x86 instruction architecture because a memory allocation function (e.g., ExAllocatePool) may be called at least once (typically multiple times) during startup of a virtual machine. This procedure may guarantee that memory-allocation module 117 may be inserted into an unused region of memory. In an alternative embodiment, memory-allocation module 117 may be inserted in a kernel image's Portable Executable ("PE") header.

At step 425, control-transfer module 116 may save a copy of data in exception handler location 132(*a*) of user virtual machine 220 before inserting one or more computer-executable instructions into exception handler location 132(*a*) of virtual machine 220. At step 430, control-transfer module 116 may insert, into exception handler location 132(*a*) of virtual machine 220, one or more computer-executable instructions configured to transfer execution to memory allocation module region 134(*a*).

At step 435, control-transfer module 116 may save a copy of data in the memory location pointed to by an instruction register of user virtual machine 220 (e.g., an EIP register), and at step 440 control-transfer module 116 may insert an instruction with an invalid op code into the memory location pointed to by the instruction register of user virtual machine 220. In some embodiments, the instruction register of user virtual machine 220 may be directly modified. However, direct modification of the instruction register may be problematic because at the time agent 118(*a*) is invoked, the current instruction register of the operating system of user virtual machine 220 may point to an instruction of a user process, and its associated execution context (e.g. stack and heap) may not be appropriate for the execution of agent 118(*a*) or memory-allocation module 117. Thus, as illustrated in FIG. 4, in some embodiments control-transfer module 116 may modify the entry point of a handler for an invalid op code exception and intentionally trigger an invalid op code exception to transfer control to an injected agent.

At step 445, control-transfer module 116 may schedule user virtual machine 220 to run, which may trigger the exception during execution and cause control to be transferred to memory-allocation module 117. In some embodiments, to avoid a double fault problem, when control reaches memory-allocation module 117, memory-allocation module 117 may return from the exception handler to another piece of code in memory-allocation module 117 that calls a memory allocation function of user virtual machine 220.

At step 450, agent-insertion module 114 may obtain control from virtual machine 220 after memory-allocation module 117 executes. In some embodiments, memory-allocation module 117 may provide agent-insertion module 114 with a pointer to a memory region allocated by the memory allocation function of the virtual machine. To transfer control to agent-insertion module 114, a breakpoint feature of the virtualization technology running the virtual machine may be used. For example, a special unused memory page may be allocated, a write trigger may be set on the page, and the page may be intentionally written to at run time.

After control is transferred to agent-insertion module 114, at step 455 agent-insertion module 114 may insert agent 118(*a*) of endpoint management system 214 into virtual user machine 220. After agent 118(*a*) has been installed, agent-insertion module 114 may restore data saved from user virtual machine 220. For example, at step 460 agent-insertion module 114 may restore, to memory allocation module region 134(*a*), the copy of data saved from memory allocation module region 134(*a*). At step 465, agent-insertion module 114 may restore, to exception handler location 132(*a*), the copy of data saved from exception handler location 132(*a*). At step 470, agent-insertion module 114 may restore, to the memory location pointed to by the instruction register, the copy of data saved from the memory location pointed to by the instruction register.

In some embodiments, steps 405-470 may be repeated for one or more other virtual machines managed by hypervisor 240. For example, steps 405-470 may be repeated for user virtual machine 230. Steps 405-470 may also be repeated for any number of other virtual machines.

As illustrated in FIGS. 4A and 4B, loading an in-guest agent of an endpoint management system into a virtual machine may include: (1) allocation of a kernel memory region to hold the agent and (2) installation of at least one pointer in the kernel to invoke the agent. Allocation of a kernel memory region may include installation of a bootstrapping driver. The following bootstrapping strategy may be used: (1) copy a guest physical memory page of the virtual machine to the endpoint management system; (2) insert the bootstrap driver into the physical memory page; (3) copy the memory location pointed to by the virtual machine's "invalid op code" interrupt descriptor table ("IDT") entry to the endpoint management system and replace it with a jump instruction to the bootstrap driver; (4) copy the memory location pointed to by the virtual machine's Enhanced Instruction Pointer ("EIP") to the endpoint management system and replace it with an instruction with an invalid op code; (5) schedule the virtual machine to run next, such that the virtual machine may a) immediately encounter an "invalid op code" exception because its EIP points to an invalid instruction and b) jump to the bootstrap driver; (6) cause the bootstrap driver to make a standard kernel API call to allocate a kernel memory region, which in turn may return the region's address space range to the endpoint management system and return control to the endpoint management system; and (7) cause the endpoint management system to copy the actual in-guest agent to the allocated address space range and restore the physical memory page and the memory location pointed to by the virtual machine's invalid op code IDT entry and the virtual machine's EIP to their original contents.

From this point on, when the endpoint management system is about to invoke a function in the in-guest agent, the endpoint management system may use the same mechanism used in steps 2-7 to transfer control of that function through an invalid op-code exception and retake control after the function returns. In addition, the endpoint management system may optionally zero-out the in-guest agent's in-memory image when the endpoint management system regains the control and may restore the agent's image when control is about to be transferred to the agent.

FIG. 5 illustrates exemplary functions performed by memory-allocation module 117. Once control is transferred to memory-allocation module 117 (e.g., after an exception has been triggered), at step 510, memory-allocation module 117 may call a memory allocation function of user virtual machine 220. The memory allocation function may include an ExAllocatePool function or any other function capable of allocating a region of memory. In some embodiments, the memory allocated may be memory allocated from a non-paged pool of user virtual machine 220.

After executing, the memory allocation function may return an address of an allocated memory region (e.g., agent region 136(*a*)). At step 520, memory-allocation module 117 may receive the address of the allocated memory region. At step 530, memory-allocation module 117 may return the address of the memory region to agent-insertion module 114, which may then insert the agent into the allocated memory region.

FIG. 6 shows steps that may be performed to prepare an agent for insertion into a virtual machine. The steps shown in FIG. 6 may be performed by any suitable computer-executable code and/or computing system. In some embodiments, the steps shown in FIG. 6 may be performed by agent-insertion module 114. FIG. 6 shows embodiments where, instead of relying on a kernel loader, control-transfer module 116 may automatically discover the export table of a running kernel image and may reconstruct the entry points of one or more service functions that the kernel exports.

At step 610, control-transfer module 116 may, before a virtual machine boots, set an execution trigger on address space of the virtual machine. The execution trigger may be configured to transfer control to agent-insertion module 114. The execution trigger may be established in a variety of manners. For example, the execution trigger may fire when an instruction register (e.g., an EIP register) of the user virtual machine first falls in the upper 2 Giga Bytes ("GB") of the virtual machine's address space during its boot up. The address at which the execution trigger fires may correspond to the kernel's base address.

Once the execution trigger has fired, agent-insertion module 114 may obtain control. At step 620, agent-insertion module 114 may identify an export table of an executable image of the virtual machine. In some embodiments, agent-insertion module 114 may scan from the trigger point towards a lower end of the kernel address space to look for a specific Portable Executable ("PE") signature at the end of every page (the start of a PE image may be page aligned). Once the kernel image's PE signature is located, agent-insertion module 114 may find the export table.

After finding the export table, at step 630 agent-insertion module 114 may parse the table to construct a map for entry points of exported kernel service functions. In some embodiments, agent-insertion module 114 may use a hypervisor API to translate the virtual addresses of the guest virtual pages being scanned into their corresponding guest physical addresses. At step 640, agent-insertion module 114 may resolve the references in the agent to the exported kernel service functions.

By using the process illustrated in FIG. 6, each in-guest agent may be compiled as if it is a standard operating system kernel driver. Given an agent binary, agent-insertion module 114 may perform the necessary linking using the kernel service function map derived in the boot-up phase and may relocate the base addresses in the agent binary accordingly once the memory region for the agent binary is determined. Once the binary code for an in-guest agent is ready and the kernel memory region to hold it in a target virtual machine is known, agent-insertion module 114 may insert the agent into the allocated region.

At a later point in time, the endpoint management system may need to use the agent. For example, if the endpoint management system performs one or more security functions, the agent may need to be invoked when a security event in the virtual machine occurs. FIG. 7 shows steps that may be performed to invoke an agent. The steps shown in FIG. 7 may be performed by any suitable computer-executable code and/or computing system. In some embodiments, the steps shown in FIG. 7 may be performed by agent-insertion module 114 and/or agent-invocation module 115. At step 710, agent-insertion module 114 may insert an agent of an endpoint management system into a virtual machine. Agent-insertion module 114 may insert the agent using any process described herein.

At step 720, agent-invocation module 115 may identify an event that triggers invocation of the endpoint management agent. The event that triggers invocation of the agent may include a security event, a backup event, a communication event, and/or any other event associated with functionality provided by the endpoint management system.

After identifying the event, agent-invocation module 115 may invoke the agent. Agent-invocation module 115 may invoke the agent using one or more of the same steps used to insert the agent (e.g., the steps illustrated in FIGS. 3 and 4). For example, at step 730 agent-invocation module 115 may insert, into an exception handler memory location of the virtual machine, one or more computer-executable instructions configured to transfer execution to a memory location where the agent is stored. At step 740, agent-invocation module 115 may trigger an exception during execution of the virtual machine to cause the agent of the endpoint management system to execute.

As an example, at a time when the agent is injected into the virtual machine, the EIP of the virtual machine may point to an instruction of a user process. There are two possible outcomes for the agent's execution. First, the agent may call a kernel service function that eventually results in termination of the user process. In this case, the kernel of the virtual machine may schedule another ready process to run once the hypervisor schedules the virtual machine to run. Second, the agent may complete its execution and return. In this situation, control may be returned to the endpoint management system and then to the interrupted EIP of the user process. However, because control may have already been returned from the invalid-opcode exception handler before calling the agent, to avoid a double fault problem, the endpoint management system may use a return instruction (e.g., an iret instruction) with proper kernel stack set-up to transfer control from the kernel to the interrupted instruction in the user process. In some embodiments, as shown in step 750, the agent may be removed from the virtual machine after the agent finishes executing.

When an endpoint management system injects an in-guest agent binary, it may include a wrapper function around the agent binary to perform various functions. In other words, an agent may include an agent binary and a wrapper function. In some embodiments, the wrapper function may determine whether to transition the virtual machine from a user mode to a kernel mode. As shown in FIG. 8, at step 810 the wrapper function may determine that the virtual machine is running in a user mode. At step 820, the wrapper function may transition the virtual machine from the user mode to a kernel mode before the agent is invoked. At step 830, the wrapper function may transition the virtual machine from the kernel mode to the user mode after the agent finishes executing. As an example of the method shown in FIG. 8, before calling the in-guest agent, the wrapper function may change a file system register's content from 0x3B to 0x30 if the interrupted EIP points to an instruction of a user process, and may restore the file system register accordingly after the in-guest agent returns.

The wrapper function may also perform various other functions. For example, after the in-guest agent returns, the wrapper function may write to a special memory page to invoke a write trigger and transfer control to the endpoint management system. After the endpoint management system transfers control back to the virtual machine, if the interrupted EIP is an instruction of a user process, the wrapper function may push the interrupted EIP to the stack and use a return instruction (e.g., an iret instruction) to return control to the interrupted user program. When a endpoint management system-induced invalid opcode interrupt occurs, the associated interrupt handler may return to the wrapper function, which in turn may call the agent. As a result, when the agent finishes executing, control may be returned to the wrapper function.

Returning from the invalid opcode handler to a wrapper function rather than the interrupted user program may serve two purposes. First, it may avoid a double fault problem. Second, it may provide the endpoint management system with the opportunity to modify the FS register properly, which should point to TEB (segment 0x3B) in user mode and to PCR (segment 0x30) in kernel mode. Traditional virtualization technology APIs may not allow an endpoint management system to modify the FS register of another virtual machine. Thus, FS register modification may need to be done by the injected code (e.g., the wrapper function).

One of the kernel memory pages allocated during the boot-up may be dedicated to input and output arguments. An endpoint management system may put input arguments into that page, and the agent may return outputs via the same page. To protect the injected in-guest agent from unauthorized modification, the endpoint management system may set a write trigger on the injected agent's code area.

In some embodiments, to further protect the injected code from being read, the endpoint management system may zero out an in-guest agent's in-memory image when a call to the agent's functions is completed and restore the agent's image when control is about to be transferred back to the agent. Thus, an in-guest agent's image may be visible to the VM's kernel only when its functions are being executed.

Through the combination of the above techniques, embodiments of the instant disclosure may allow a hypervisor or security virtual machine to inject and start the execution of a piece of code in another virtual machine without involving the injected virtual machine's kernel. In-guest agents may be completely invisible to the kernel into which they are loaded, so that even when an in-guest agent's hosting kernel is compromised, the agent's integrity can still be protected. In addition, the execution of the injected code may not leave any side effects except those left by its calls to kernel service functions. Furthermore, injected in-guest agents may be able to perform various operations without providing various security credentials that would be required to install an agent in a virtual machine.

The instant disclosure describes a generic technique to simplify the deployment, and protect the integrity, of in-guest agents. The instant disclosure also describes a run-time execution architecture that may allow an in-guest agent in a endpoint management system architecture, which may be in the form of a kernel driver, to be: 1) injected into its target guest virtual machine on demand without requiring any manual installation and/or authentication credentials and/or 2) executed within the target guest virtual machine in a way that is protected even when the target guest's kernel is compromised. This ability may greatly simplify the complexity of endpoint management and significantly enhance the integrity of in-guest agents for endpoint management tasks. In other words, the exemplary approaches described herein may represent the best of both worlds: the simplicity and security of agentless architecture and the rich functionality of agentful architecture.

FIG. 9 is a block diagram of an exemplary computing system 910 capable of implementing one or more of the embodiments described and/or illustrated herein. Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein. For example, processor 914 may perform and/or be a means for performing, either alone or in combination with other elements, one or more of the identifying, injecting, performing, determining, deleting, remediating, mounting, transferring, executing, logging, interrupting, triggering, obtaining, inserting, locating, setting, calling, returning, saving, and/or restoring steps described herein. Processor 914 may also perform and/or be a means for performing any other steps, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 110 from FIG. 1 may be loaded into system memory 916.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller 918 may perform and/or be a means for performing, either alone or in combination with other elements, one or more of the steps or features described and/or illustrated herein, such as the identifying, injecting, performing, determining, deleting, remediating, mounting, transferring, executing, logging, interrupting, triggering, obtaining, inserting, locating, setting, calling, returning, saving, and/or restoring.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934. I/O controller 920 may be used, for example, to perform and/or be a means for performing, either alone or in combination with other elements, one or more of the identifying, injecting, performing, determining, deleting, remediating, mounting, transferring, executing, logging, interrupting, triggering, obtaining, inserting, locating, setting, calling, returning, saving, and/or restoring steps described herein. I/O controller 920 may also be used to perform and/or be a means for performing other steps and features set forth in the instant disclosure.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 994 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution. In certain embodiments, communication interface 922 may perform and/or be a means for performing, either alone or in combination with other elements, one or more of the identifying, injecting, performing, determining, deleting, remediating, mounting, transferring, executing, logging, interrupting, triggering, obtaining, inserting, locating, setting, calling, returning, saving, and/or restoring steps disclosed herein. Communication interface 922 may also be used to perform and/or be a means for performing other steps and features set forth in the instant disclosure.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device. In at least one embodiment, input device 928 may perform and/or be a means for performing, either alone or in combination with other elements, one or more of the identifying, injecting, performing, determining, deleting, remediating, mounting, transferring, executing, logging, interrupting, triggering, obtaining, inserting, locating, setting, calling, returning, saving, and/or restoring steps disclosed herein. Input device 928 may also be used to perform and/or be a means for performing other steps and features set forth in the instant disclosure.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

In certain embodiments, storage devices 932 and 933 may be used, for example, to perform and/or be a means for performing, either alone or in combination with other elements, one or more of the identifying, injecting, performing, determining, deleting, remediating, mounting, transferring, executing, logging, interrupting, triggering, obtaining, inserting, locating, setting, calling, returning, saving, and/or restoring steps disclosed herein. Storage devices 932 and 933 may also be used to perform and/or be a means for performing other steps and features set forth in the instant disclosure.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application specific integrated circuit (ASIC) adapted to implement one or more of the exemplary embodiments disclosed herein.

FIG. 10 is a block diagram of an exemplary network architecture 1000 in which client systems 1010, 1020, and 1030 and servers 1040 and 1045 may be coupled to a network 1050. Client systems 1010, 1020, and 1030 generally represent any type or form of computing device or system, such as exemplary computing system 910 in FIG. 9. In one example, client system 1010 may include system 100 from FIG. 1.

Similarly, servers 1040 and 1045 generally represent computing devices or systems, such as application servers or database servers, configured to provide various database services and/or run certain software applications. Network 1050 generally represents any telecommunication or computer network including, for example, an intranet, a wide area network (WAN), a local area network (LAN), a personal area network (PAN), or the Internet.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage (NAS) devices configured to communicate with servers 1040 and 1045 using various protocols, such as NFS, SMB, or CIFS.

Servers 1040 and 1045 may also be connected to a storage area network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050. Accordingly, network architecture 1000 may perform and/or be a means for performing, either alone or in combination with other elements, one or more of the identifying, injecting, performing, determining, deleting, remediating, mounting, transferring, executing, logging, interrupting, triggering, obtaining, inserting, locating, setting, calling, returning, saving, and/or restoring steps disclosed herein. Network architecture 1000 may also be used to perform and/or be a means for performing other steps and features set forth in the instant disclosure.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

One or more of the software modules described herein may transform data and/or representations of physical entities from one form to another. For example, an agent-insertion module may transform an agentless user virtual machine into an agent-enabled virtual machine by inserting an agent into the virtual machine.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive.

Unless otherwise noted, the terms "a" or "an," as used herein, are to be construed as meaning "at least one of." In addition, for ease of use, the words "including" and "having," as used herein, are interchangeable with and have the same meaning as the word "comprising."

What is claimed is:

1. A computer-implemented method for inserting endpoint management agents into virtual machines, at least a portion of the method being performed by a computing system comprising at least one processor, the method comprising:

selecting a process of a virtual machine with one or more credentials that allow the process to perform an endpoint management task on the virtual machine, wherein a process space of the virtual machine comprises the process;

hijacking the process of the virtual machine by:

interrupting the process of the virtual machine as the process is running by causing execution to transfer from the process of the virtual machine to an agent-insertion module that executes outside the process space of the virtual machine by:

inserting, into an exception handler memory location of the virtual machine, one or more computer-executable instructions configured to facilitate transfer of control from the virtual machine to the agent-insertion module;

triggering an exception during execution of the virtual machine to cause the one or more computer-executable instructions in the exception handler memory location to be executed;
obtaining control from the virtual machine after the one or more computer-executable instructions execute;
injecting, via the agent-insertion module, an endpoint management agent into the virtual machine, wherein hijacking the process of the virtual machine causes the endpoint management agent to assume the one or more credentials of the process;
performing the endpoint management task by causing the endpoint management agent to execute within the process space of the virtual machine.

2. The method of claim 1, wherein injecting the endpoint management agent into the virtual machine is performed without providing installation credentials that are required to install software on the virtual machine.

3. The method of claim 1, wherein the endpoint management task comprises:
determining that the virtual machine does not comply with an endpoint management policy;
remediating the virtual machine to bring the virtual machine into compliance with the endpoint management policy.

4. The method of claim 1, wherein the endpoint management task comprises at least one of:
updating a registry entry on the virtual machine;
updating a program on the virtual machine;
executing a program on the virtual machine;
installing a program on the virtual machine;
uninstalling a program on the virtual machine.

5. The method of claim 1, wherein injecting the endpoint management agent into the virtual machine comprises copying the endpoint management agent to the virtual machine such that deployment of the endpoint management agent is transparent to a user of the virtual machine.

6. The method of claim 1, further comprising:
inserting, into a first memory location of the virtual machine, one or more computer-executable instructions configured to allocate a region of memory for the endpoint management agent, wherein inserting the one or more computer-executable instructions into the exception handler memory location of the virtual machine comprises inserting, into the exception handler memory location of the virtual machine, one or more computer-executable instructions configured to transfer execution to the first memory location of the virtual machine;
locating a return point of a memory allocation function of the virtual machine;
setting an execution trigger associated with the memory allocation function at a point before the return point, the execution trigger being configured to transfer control to the agent-insertion module to allow the agent-insertion module to insert, into memory allocated by the memory allocation function, the one or more computer executable instructions configured to allocate a region of memory for the endpoint management agent.

7. The method of claim 6, wherein the one or more computer-executable instructions configured to allocate a region of memory for the endpoint management agent are configured to:
call a memory allocation function of the virtual machine;
return an address of a memory region allocated by the memory allocation function to the agent-insertion module, wherein the agent-insertion module inserts the endpoint management agent into the virtual machine at the memory region allocated by the memory allocation function.

8. The method of claim 6, further comprising:
saving a copy of data in the first memory location of the virtual machine before inserting the one or more computer-executable instructions configured to allocate a region of memory for the endpoint management agent;
after the region of memory for the endpoint management agent is allocated, restoring, to the first memory location of the virtual machine, the copy of data from the first memory location of the virtual machine.

9. The method of claim 1, wherein:
the exception comprises an invalid-op-code exception;
triggering the exception comprises inserting an instruction with an invalid op code into a memory location pointed to by an instruction register of the virtual machine.

10. A system for inserting endpoint management agents into virtual machines, the system comprising:
an identification module programmed to select a process of a virtual machine with one or more credentials that allow the process to perform an endpoint management task on the virtual machine, wherein a process space of the virtual machine comprises the process;
an endpoint management agent programmed to execute within the process space of the virtual machine and perform the endpoint management task on the virtual machine;
a control-transfer module programmed to hijack the process of the virtual machine by:
interrupting the process of the virtual machine as the process is running by causing execution to transfer from the process of the virtual machine to an agent-insertion module programmed to execute outside the process space of the virtual machine by:
inserting, into an exception handler memory location of the virtual machine, one or more computer-executable instructions configured to facilitate transfer of control from the virtual machine to the agent-insertion module;
triggering an exception during execution of the virtual machine to cause the one or more computer-executable instructions in the exception handler memory location to be executed;
obtaining control from the virtual machine after the one or more computer-executable instructions execute;
inserting, via the agent-insertion module, the endpoint management agent into the virtual machine, wherein hijacking the process of the virtual machine causes the endpoint management agent to assume the one or more credentials of the process;
one or more processors configured to execute the identification module, the endpoint management agent, the agent-insertion module, and the control-transfer module.

11. The system of claim 10, wherein the agent-insertion module is programmed to insert the endpoint management agent into the virtual machine without providing installation credentials that are required to install software on the virtual machine.

12. The system of claim 10, wherein the endpoint management task comprises:
determining that the virtual machine does not comply with an endpoint management policy;

remediating the virtual machine to bring the virtual machine into compliance with the endpoint management policy.

13. The system of claim 10, wherein the endpoint management task comprises at least one of:
    updating a registry entry on the virtual machine;
    updating a program on the virtual machine;
    executing a program on the virtual machine;
    installing a program on the virtual machine;
    uninstalling a program on the virtual machine.

14. The system of claim 10, wherein the agent-insertion module inserts the endpoint management agent into the virtual machine by copying the endpoint management agent to the virtual machine such that deployment of the endpoint management agent is transparent to a user of the virtual machine.

15. The system of claim 10, wherein the control-transfer module is further programmed to interrupt the process of the virtual machine by:
    inserting, into a first memory location of the virtual machine, one or more computer-executable instructions configured to allocate a region of memory for the endpoint management agent, wherein inserting the one or more computer-executable instructions into the exception handler memory location of the virtual machine comprises inserting, into the exception handler memory location of the virtual machine, one or more computer-executable instructions configured to transfer execution to the first memory location of the virtual machine;
    locating a return point of a memory allocation function of the virtual machine;
    setting an execution trigger associated with the memory allocation function at a point before the return point, the execution trigger being configured to transfer control to the agent-insertion module to allow the agent-insertion module to insert, into memory allocated by the memory allocation function, the one or more computer executable instructions configured to allocate a region of memory for the endpoint management agent.

16. The system of claim 15, wherein the one or more computer-executable instructions configured to allocate a region of memory for the endpoint management agent are configured to:
    call a memory allocation function of the virtual machine;
    return an address of a memory region allocated by the memory allocation function to the agent-insertion module, wherein the agent-insertion module inserts the endpoint management agent into the virtual machine at the memory region allocated by the memory allocation function.

17. The system of claim 15, wherein the control-transfer module is further programmed to:
    save a copy of data in the first memory location of the virtual machine before inserting the one or more computer-executable instructions configured to allocate a region of memory for the endpoint management agent;
    after the region of memory for the endpoint management agent is allocated, restore, to the first memory location of the virtual machine, the copy of data from the first memory location of the virtual machine.

18. The system of claim 10, wherein:
    the exception comprises an invalid-op-code exception;
    triggering the exception comprises inserting an instruction with an invalid op code into a memory location pointed to by an instruction register of the virtual machine.

19. A non-transitory computer-readable-storage medium comprising one or more computer-executable instructions that, when executed by at least one processor of a computing device, cause the computing device to:
    select a process of a virtual machine with one or more credentials that allow the process to perform an endpoint management task on the virtual machine, wherein a process space of the virtual machine comprises the process
    hijack the process of the virtual machine by:
        interrupting the process of the virtual machine as the process is running by causing execution to transfer from the process of the virtual machine to an agent-insertion module that executes outside the process space of the virtual machine by:
            inserting, into an exception handler memory location of the virtual machine, one or more computer-executable instructions configured to facilitate transfer of control from the virtual machine to the agent-insertion module;
            triggering an exception during execution of the virtual machine to cause the one or more computer-executable instructions in the exception handler memory location to be executed;
            obtaining control from the virtual machine after the one or more computer-executable instructions execute;
        injecting, via the agent-insertion module, an endpoint management agent into the virtual machine, wherein hijacking the process of the virtual machine causes the endpoint management agent to assume the one or more credentials of the process;
    perform the endpoint management task on the virtual machine by causing the endpoint management agent to execute within the process space of the virtual machine.

20. The non-transitory computer-readable-storage medium of claim 19, wherein the endpoint management task comprises:
    determining that the virtual machine does not comply with an endpoint management policy;
    remediating the virtual machine to bring the virtual machine into compliance with the endpoint management policy.

* * * * *

UNITED STATES PATENT AND TRADEMARK OFFICE
CERTIFICATE OF CORRECTION

| | | |
|---|---|---|
| PATENT NO. | : 8,910,155 B1 | Page 1 of 1 |
| APPLICATION NO. | : 12/938039 | |
| DATED | : December 9, 2014 | |
| INVENTOR(S) | : William E. Sobel and Bruce McCorkendale | |

It is certified that error appears in the above-identified patent and that said Letters Patent is hereby corrected as shown below:

In the Claims,

Claim 19, at column 24, lines 19-20, should read:

process space of the virtual machine comprises the process;

Signed and Sealed this
Nineteenth Day of May, 2015

Michelle K. Lee
*Director of the United States Patent and Trademark Office*